(12) United States Patent
Pötke (10) Patent No.: US 8,000,536 B2
(45) Date of Patent: Aug. 16, 2011

(54) DETERMINING AND USING GEOMETRIC FEATURE DATA (75) Inventor: Marco Pötke, Haar (DE)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1133 days.

(21) Appl. No.: 10/598,448

(22) PCT Filed: Mar. 4, 2005

(86) PCT No.: PCT/EP2005/002303
§ 371 (c)(1),
(2), (4) Date: May 9, 2007

(87) PCT Pub. No.: WO2005/086082
PCT Pub. Date: Sep. 15, 2005

(65) Prior Publication Data
US 2007/0217681 A1    Sep. 20, 2007

(30) Foreign Application Priority Data

Mar. 8, 2004    (EP) .................................... 04005458

(51) Int. Cl.
*G06K 9/46* (2006.01)
(52) U.S. Cl. ........ 382/203; 382/225; 382/159; 382/103; 702/19
(58) Field of Classification Search .................. 382/103, 382/118, 203, 225, 159, 181; 702/19
See application file for complete search history.

(56) References Cited

U.S. PATENT DOCUMENTS 5,740,270 A * 4/1998 Rutenberg et al. ............ 382/133
6,091,842 A * 7/2000 Domanik et al. ............. 382/133
6,246,785 B1 * 6/2001 Molnar et al. ................ 382/133

(Continued)

OTHER PUBLICATIONS

Darwish et al. "A Rule Based Approach for Visual Pattern Inspection" IEEE Transactions on Pattern Analysis and Machine Intelligence, vol. 10, No. 1, Jan. 1988, pp. 1-13.*

(Continued)

*Primary Examiner* — Jason M Repko
*Assistant Examiner* — Mia M Thomas
(74) *Attorney, Agent, or Firm* — Michael J. Wallace, Jr.

(57) ABSTRACT

The invention concerns a method for determining feature data that represents information about the shape of an object. A partitioning scheme (RP) is determined that defines a plurality of cells (p) in the space in which the object is located such that at least some of the cells (p) each contain a respective portion of the object, and the feature data is determined for the object on the basis of at least one property of the respective portions of the object that are contained in the plurality of cells (p). According to a first aspect of the invention, at least two of the plurality of cells (p) overlap each other at least in part, and according to a second aspect of the invention, at least some of the boundaries of the cells (p) delimit a plurality of regions (r) in the space in which the object is located such that the respective portions of the object that are contained in the plurality of regions (r) are approximately equal to each other with respect to a predetermined measurement metric. The method may be used for performing a similarity search or for performing a similarity classification. A computer program product and an apparatus comprise corresponding features. The invention provides a technology for improving the accuracy and/or effectiveness and/or performance and/or usefulness of prior art methods for determining geometric feature data.

16 Claims, 4 Drawing Sheets

U.S. PATENT DOCUMENTS

| | | | |
|---|---|---|---|
| 6,249,606 B1* | 6/2001 | Kiraly et al. | 382/195 |
| 6,327,377 B1* | 12/2001 | Rutenberg et al. | 382/133 |
| 6,731,781 B1* | 5/2004 | Shams et al. | 382/129 |
| 6,768,488 B1* | 7/2004 | Kotani et al. | 345/441 |
| 6,928,450 B2* | 8/2005 | Mogi et al. | 1/1 |
| 6,956,568 B2* | 10/2005 | Maekawa et al. | 345/420 |
| 7,006,927 B2* | 2/2006 | Yakhini et al. | 702/28 |
| 7,083,405 B2* | 8/2006 | Koyagi et al. | 425/174.4 |
| 7,430,500 B2* | 9/2008 | Lei et al. | 703/9 |
| 7,653,495 B1* | 1/2010 | Murali et al. | 702/27 |
| 7,707,488 B2* | 4/2010 | Gurcan et al. | 715/227 |
| 7,765,070 B2* | 7/2010 | Nicholls | 702/19 |
| 2002/0001398 A1* | 1/2002 | Shimano et al. | 382/104 |
| 2003/0036842 A1* | 2/2003 | Hancock | 701/200 |
| 2003/0185436 A1* | 10/2003 | Smith | 382/159 |
| 2004/0006431 A1* | 1/2004 | Bartell et al. | 702/19 |
| 2004/0139103 A1* | 7/2004 | Boyce et al. | 707/102 |
| 2004/0160590 A1* | 8/2004 | Koyagi et al. | 355/67 |
| 2005/0075847 A1* | 4/2005 | Yamada et al. | 703/2 |
| 2005/0152588 A1* | 7/2005 | Yoshida et al. | 382/128 |
| 2005/0175235 A1* | 8/2005 | Luo et al. | 382/159 |
| 2005/0283513 A1* | 12/2005 | Usami et al. | 708/446 |
| 2006/0089803 A1* | 4/2006 | Lei et al. | 702/1 |
| 2006/0293840 A1* | 12/2006 | Klein | 701/201 |
| 2007/0058455 A1* | 3/2007 | Usami et al. | 365/189.07 |
| 2008/0002873 A1* | 1/2008 | Reeves et al. | 382/133 |
| 2008/0043039 A1* | 2/2008 | Yamaji et al. | 345/632 |
| 2008/0184185 A1* | 7/2008 | Saelzer et al. | 716/11 |
| 2009/0060274 A1* | 3/2009 | Kita | 382/103 |
| 2010/0054607 A1* | 3/2010 | Aono et al. | 382/203 |

OTHER PUBLICATIONS

Kriegel et al. "Using Sets of Feature Vectors for Similarity Search on Voxelized CAD Objects", Jun. 9-12, 2003, pp. 1-12.*

Wu et al. "Automated Inspection of Printed Circuit Boards through Machine Vision" Computers in Industry 28 (1996), pp. 103-111.*

Abfalg et al "Accurate and Efficient Similarity Search on 3D Objects Using Point Sampling, Redundancy and Proportionality" SSTD (2005) LNCS 3633, pp. 200-217.*

Kriegel et al. "Interval Sequences: An Object Relational Approach to Manage Spatial Data" SSTD 2001 LNCS 2121, pp. 481-501.*

Hoffman et al. "Parts of Recognition" MIT AI Lab AI Memo No. 732 12_1983 pp. 1-35.*

Kriegel et al. "Managing Intervals Efficiently in Object Relational Databases" Proc. of the 26th International Conference on Very Large Databases Cairo, Egypt (2000) pp. 1-12.*

* cited by examiner

Fig. 1 o (k-dimensional surface or solid)

bs(o) (minimum bounding sphere of o with center c and radius rad)

DE(o) (a *disjoint* and *equidistant* partitioning scheme for o)

Fig. 2 (Prior Art)

DP(o) (a *disjoint* and *proportional* partitioning scheme for o)

DETERMINING AND USING GEOMETRIC FEATURE DATA

The present invention generally concerns the technical field of the computer-based processing of objects that have different shapes and different geometrical features; More particularly, the present invention concerns the field of determining and using feature data that represents information about the shape of an object. The teaching of the present invention can be employed in a variety of applications including, but not limited to, the similarity search and classification on protein, CAD, and web data.

In the last ten years, an increasing number of database applications has emerged for which efficient and effective support for similarity search is essential. The importance of similarity search and classification grows in application areas such as multimedia, medical imaging, molecular biology, computer aided engineering, marketing, procurement and controlling. In particular, the task of finding similar shapes in 2-D and 3-D becomes more and more important. Based on the shape of a geometric object, similar objects have to be retrieved (similarity search), and clusters of similar objects have to be detected (classification).

A widely used class of similarity models is based on the paradigm of feature vectors. An example of this paradigm can be described as follows: The shape of a 3-dimensional object is described by a set of 3-dimensional points, aligned onto a regular grid. Thus, an object o is regarded as an element of the power set $\wp(\mathbb{R}_3)$, and the volume or the surface of o (depending on the object type) is measured by its cardinality |o|. Using a feature transform, any object o is mapped onto a feature vector in an appropriate multidimensional feature space. The similarity of two objects is then defined as the proximity of their feature vectors in the feature space: The closer their feature vectors are located, the more similar the two objects are considered.

The research paper "Effective Similarity Search on Voxelized CAD Objects" by Kriegel H.-P., Kröger P., Mashael Z., Pfeifle M., Pötke M., and Seidl T., in Proc. 8th Int. Conf. on Database Systems for Advanced Applications (DASFAA), Kyoto, 2003, pp. 27-38, summarizes a number of known approaches in which feature-based similarity models are used. In particular, this paper discloses a method for determining feature data for an object by determining a partitioning scheme that defines a plurality of cells in the space in which the object is located and determining the feature data for the object on the basis of at least one property, e.g., the volume, of the respective portions of the object that are contained in the plurality of cells. Partitioning schemes based on equidistant shells or regular sectors or combinations thereof are disclosed. The above research paper is herewith incorporated into the present document in its entirety.

The research paper "Rotation Invariant Spherical Harmonic Representation of 3D Shape Descriptors" by Kazhdan M., Funkhouser T., and Rusinkiewicz S. in Proc. 1st Eurographics Symposium on Geometry Processing (SGP), Aachen, 2003, pp. 167-175, contains an overview of various known approaches to the problem of evaluating shape similarity.

An object of the present invention is to provide a technology for improving the accuracy and/or effectiveness and/or performance and/or usefulness of prior art methods for determining geometric feature data. In a preferred embodiment, the feature data has the property that it improves the accuracy of a subsequent similarity search or classification such that an improved overall accuracy may be achieved and/or the computational effort and amount of storage required to achieve a desired accuracy level may be reduced.

According to the present invention, the above object is achieved at least in part by a method according to claim 1, a method according to claim 5, a use according to claim 14, a use according to claim 15, a computer program product according to claim 16, and an apparatus according to claim 17. The dependent claims define preferred embodiments of the invention.

A first aspect of the invention is based on the idea to use a partitioning scheme that defines a plurality of cells such that at least two of these cells overlap each other at least in part. Such a partitioning scheme will also be called a "redundant partitioning scheme" in the present document. The redundancy in itself requires additional computational effort. However, experiments have resulted in the surprising finding that this effect is overcompensated by the increase in accuracy of the obtained feature data so that it becomes possible to use much coarser partitioning schemes than those which would be necessary according to the prior art. All in all, the total computational effort and storage requirements are significantly reduced by the seemingly wasteful use of redundant partitioning schemes.

According to a second aspect of the present invention, a partitioning scheme is used that defines a plurality of cells, wherein at least some of the boundaries of these cells delimit a plurality of regions in the space in which the object is located such that the respective portions of the object that are contained in the plurality of regions are approximately equal to each other with respect to a predetermined measurement metric. Partitioning schemes that define cells that may be grouped into such regions are called "proportional partitioning schemes" in the present document. Again, experiments have shown that the use of a proportional partitioning scheme leads to higher overall accuracy and/or makes it possible to select coarser partitioning schemes than would otherwise be necessary.

The partitioning scheme may define, in preferred embodiments of the invention, many overlapping cells. For example, at least 50% or at least 90% of all cells defined by the partitioning scheme may overlap other cells partially or completely. In some embodiments, the plurality of cells may contain at least two groups of cells that partition one and the same region in the space in which the object is located in different ways. In other words, the respective unions of all cells in each of these groups of cells coincide, and each cell in one group overlaps at least in part with at least one cell of each other group.

In some embodiments of the invention, the cells defined by the partitioning scheme may comprise a group of nested cells. Each overlapping of cells in this group is a complete overlapping. The partitioning scheme may or may not define additional cells that do not belong into this group of nested cells. The cells of the group of nested cells preferably form a sequence in which the k-dimensional volume of the respective portions of the object that are contained in the cells of the group of nested cells increases in an approximately or exactly regular manner. In other words, the first cell in the group of nested cells may contain one volume unit of the object, the second cell may contain approximately one additional volume unit, the third cell a further additional volume unit, and so on. Other embodiments may use a partitioning scheme that does not specify any complete overlapping—i.e., nesting—of any cells, but only partial overlappings.

Although the use of a partitioning scheme that is either redundant or proportional already confers substantial advantages, it is especially preferred to use a partitioning scheme that is both redundant and proportional. Experiments have shown that this combination achieves unexpected synergistic benefits that go beyond the mere sum of the benefits of only redundant and only proportional partitioning schemes. In some embodiments, the redundant and proportional aspects are combined in a way such that at least one of the proportional regions contains at least two partially or fully overlapping cells.

In some embodiments the proportional regions are disjoint with respect to each other, while in other embodiments these regions overlap at least in part. The regions do not necessarily need to cover the complete space in which the object is located. In some embodiments there are additional cells that are not part of any of the proportional regions, while in other embodiments all cells that are defined by the partitioning scheme belong to at least one of the regions.

It is preferred that the measurement metric according to which the respective portions of the object contained in the regions are required to be approximately equal is the k-dimensional volume of the respective portions of the object. In the three-dimensional case, this volume would be the "usual" spatial volume of the respective object portions, while the two-dimensional volume would actually be the area taken in by the respective object portions. Other metrics may be used in other embodiments, for example the surface area of a three-dimensional object portion.

According to the second aspect of the present invention, the proportional regions are delimited by the boundaries of the cells defined by the partitioning scheme. In preferred embodiments, this means that each region corresponds to the union and/or difference and/or intersection of at least two cells or to exactly one cell. Preferably, each region may correspond to a single cell or to a group of cells or to the difference of a first cell or group of cells minus a second cell or group of cells.

In general, the cells and/or regions may have any suitable shape, but a regular shape is often advantageous. Preferably at least some of the cells and/or regions or all of the cells and/or regions have one of the following shapes: k-dimensional spheres, k-dimensional shells, sectors of k-dimensional spheres, and sectors of k-dimensional shells in the space in which the object is located.

The present invention comprises the step of determining the feature data for the object on the basis of at least one property of the respective portions of the objects that are contained in the partitioning scheme cells. Several ways of accomplishing this step are known as such and may also be used in connection with an implementation of the present invention. For example, the feature data for the object may be determined on the basis of the k-dimensional volume of each respective portion of the object contained in each cell of the plurality of cells and/or on the basis of data defining the k principal axes of each respective portion of the object contained in each cell of the plurality of cells.

The feature data that is obtained by the present invention may, in some embodiments, be a feature vector. This feature data may be used in a variety of ways, which are also known as such. For example, the feature data may be used for performing a similarity search or a similarity classification of a plurality of objects.

The computer program product of the present invention comprises program instructions that implement the inventive methods. The computer program product may, for example, be a material data carrier like, e.g., a semiconductor memory or a computer disk or a CD-ROM. However, the computer program product may also be an immaterial data carrier like, e.g., a signal transmitted in a computer network. The apparatus of the present invention may be a common personal computer or a workstation or a mainframe computer or a computer network programmed to implement the inventive methods. Preferred embodiments of the computer program product and/or the apparatus comprise features that correspond to the features mentioned above and/or in the dependent method claims.

Further features, objects and advantages of the present invention will be apparent from the following detailed description of several sample embodiments. Reference is made to the drawings, in which.

The present invention is generally used to obtain feature data that represents information about the shape of an object, the object being located in a k-dimensional space. In the sample embodiments that are described in the following, an object o will be specified by a set of k-dimensional points, aligned onto a regular grid. Thus, the object o can be regarded as an element of the power set $\wp(\mathbb{R}_k)$. We suppose that a predetermined set $O \subset \wp(\mathbb{R}_k)$, namely the domain of k-dimensional objects, has been defined. The volume or the surface of o (depending on the object type) is measured by its cardinality |o|.

The feature data obtained in the present sample embodiments is called a "feature vector". Formally, the present sample embodiments implement a so-called feature transform or feature extractor $\phi: O \to \mathbb{R}_h$, which maps any object o of the object domain O onto a corresponding feature vector in an appropriate h-dimensional feature space.

The intended use of the feature data is for performing similarity searches or similarity classifications. The similarity of two objects may be defined as the proximity of their feature vectors in the feature space: The closer their feature vectors are located, the more similar the two objects are considered. More formally, let $\delta: \mathbb{R}_h \times \mathbb{R}_h \to \mathbb{R}$ be a distance function between two h-dimensional feature vectors. The distance function $\delta$ may, for example, be the Manhattan distance or the Euclidian distance. The feature-based object similarity $\sigma: O \times O \to \mathbb{R}$ of two objects $o_1, o_2 \in O$ is then defined by $\sigma(o_1, o_2) = \delta(\phi(o_1), \phi(o_2))$. In alternative embodiments, other measures of object similarity can be used that take into account possible rotations or reflections or translations of the objects; reference is made to section 3.3. of the already cited research paper "Effective Similarity Search on Voxelized CAD Objects" in this respect.

Figure 1:
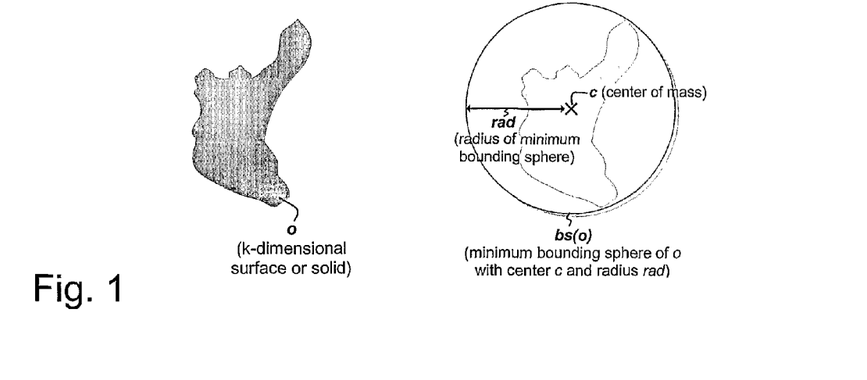
FIG. 1 shows an example of an object and the corresponding minimum bounding sphere.

In the present sample embodiments, the calculation of a feature vector for an object o is based on a partitioning scheme that defines a plurality of cells in the k-dimensional space in which the object o is located. A variety of domains can be chosen for this partitioning scheme. In the present sample embodiments, the minimum bounding sphere bs(o) of the object o is used as the domain for the partitioning scheme. This is shown in FIG. 1. More formally, the minimum bounding sphere $bs(o) \subset \mathbb{R}_k$ of an object o∈O is the smallest k-dimensional sphere around the center of mass c of o, such that o is completely covered by bs(o). Other domains for the partitioning scheme may be used in alternative embodiments of the present invention.

According to the present sample embodiments, a partitioning scheme defines a plurality of spatial cells $p_i$ for an object o such that the union of these cells $p_i$ completely fills the domain for this partitioning scheme, i.e., in the present case, the minimum bounding sphere bs(o). More formally, let $O \subset \wp(\mathbb{R}_k)$ be a domain of k-dimensional objects, and let $P \subset \wp(\mathbb{R}_k)$ be a domain of k-dimensional cells. Then a partitioning scheme $\pi: O \to P_d$ defines for a given object o∈O and its minimum bounding sphere bs(o) a sequence $\pi(o)=(p_1, \ldots, p_d)$ of d spatial cells, where $\cup_{i=1}^{d} p_i = bs(o)$. It should be noted that the cells $p_i$ defined by the partitioning scheme $\pi$ do not necessarily have to be disjoint.

The feature data or feature vector for the object o is determined on the basis of at least one property of the respective portions of the object o that are contained in each of the cells $p_i$ according to the partitioning scheme $\pi$. For formalizing this concept, an aggregation $\alpha: O \times P \to \mathbb{R}_a$ is introduced, which maps all points of o∈O that are contained in a given cell p∈P onto an a-dimensional vector $\alpha(o,p)$. The feature extractor $\phi: O \to \mathbb{R}_h$ of the present sample embodiments then has the property that it can be expressed as the concatenation of the results of the aggregation function $\alpha$ applied to the object o and the individual cells $p_i$ of the partitioning scheme. More formally, the feature extractor $\phi: O \to \mathbb{R}_h$ of the present sample embodiments has the property that a partitioning $\pi$ and an aggregation $\alpha$ exist such that $\phi$ can be expressed as $\phi(o)=(\alpha(o,p_1), \ldots, \alpha(o,p_d))$, where $\pi(o)=(p_1, \ldots, p_d)$ and h=d·a. We call such a feature extractor $\phi$ a partitioning scheme based feature extractor.

Figure 2:
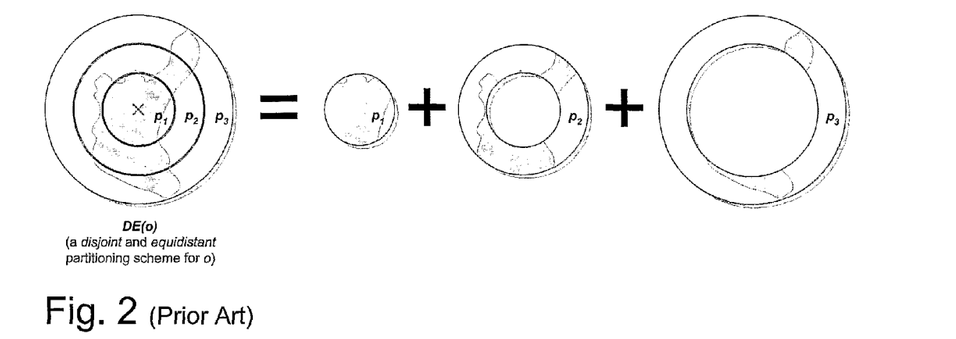
FIG. 2 shows an example of a disjoint and equidistant partitioning scheme according to the prior art.

FIG. 2 shows a partitioning scheme as known in the prior art with three cells (d=3). This partitioning scheme has the properties that (1) all cells $p_i$ are disjoint, and (2) the boundaries of the cells $p_i$ are equidistant. The first cell $p_1$ has the shape of a k-dimensional sphere (i.e., a circle in the case k=2 and a spatial sphere in the case k=3), and the second and third cells $p_2$, $p_3$ each have the shape of a k-dimensional shell around the center c of the minimum bounding sphere bs(o). The partitioning scheme of FIG. 2 is called DE for disjoint and equidistant.

Figure 3:
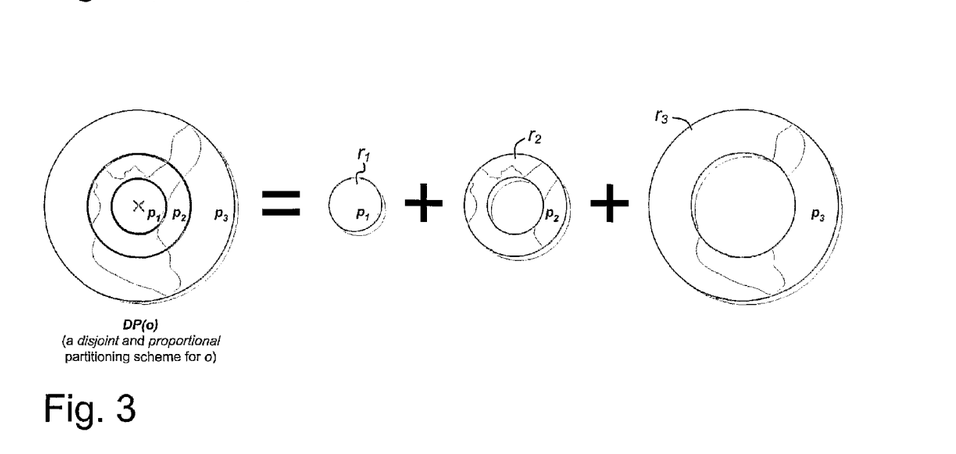
FIG. 3 shows an example of a disjoint and proportional partitioning scheme according to a first embodiment of the present invention.

FIG. 3 depicts a partitioning scheme according to a first sample embodiment of the present invention with three cells (d=3). Generally, all partitioning schemes of the present invention are especially suitable for heterogeneous object databases. The partitioning scheme of FIG. 3 is a so-called proportional partitioning scheme. In the proportional partitioning schemes of the sample embodiments described herein, the boundaries of the cells or some of these boundaries delimit a number of regions in the space such that the object volume captured in each region is at least approximately constant. Thus, the cell and region boundaries adapt to the individual shape of each object.

In the sample embodiment of FIG. 3, each cell $p_1$, $p_2$, $p_3$ corresponds exactly to one of these proportional regions, which are denoted $r_1$, $r_2$, $r_3$. More formally, each of the regions $r_i$, $1 \leq i \leq 3$, has the property that the fraction of the object o contained in the region $r_i$ has a constant volume, i.e.

$$|o \cap r_i| = \frac{|o|}{d'}$$

for d'=d=3 and $r_i=p_i$.

The proportional partitioning scheme of FIG. 3 is called DP for disjoint and proportional. If the prior art partitioning scheme of FIG. 2 is referred to as a shape histogram, then the approach of FIG. 3 may be called a shape quantile, where a quantile is determined by the number d of partitioning cells defined by the partitioning scheme.

Figure 4:
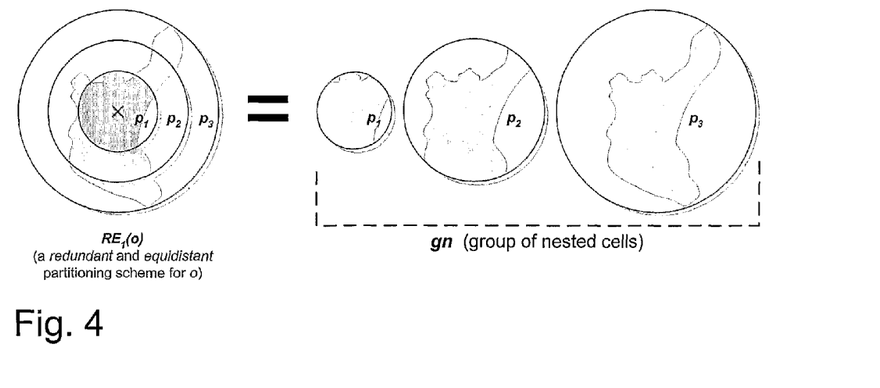
FIG. 4 shows a first example of a redundant and equidistant partitioning scheme according to a second embodiment of the present invention.

FIG. 4 shows a further sample embodiment of the present invention, namely a so-called redundant partitioning scheme with three cells (d=3). Experiments have demonstrated that the use of redundancy—i.e., overlapping cells—often increases the quality and usefulness of the similarity data, especially for complex objects. It is believed that the whole object shape is preserved much better by not splitting the object into disjoint cells. In the present sample embodiments, the concept of a redundant partitioning scheme $\pi: O \to P_d$ with $\pi(o)=(p_1, \ldots, p_d)$ can formally be expressed by the property that cells $p_i$, $p_j$ exist for i≠j and $1 \leq i$, $j \leq d$, which share a non-empty spatial region, i.e., $p_i \cap p_j \neq \emptyset$.

In the sample embodiment of FIG. 4, the cells $p_i$ form a single group gn of nested cells. In other words, the smallest cell $p_1$ is fully contained in the cell $p_2$, and the cell $p_2$ in turn is fully contained in the largest cell $p_3$. The cells $p_1$ to $p_3$ therefore constitute a fully ordered sequence with respect to the "is contained in" relation. Furthermore, the boundaries of the cells $p_i$ are equidistant.

Figure 5:
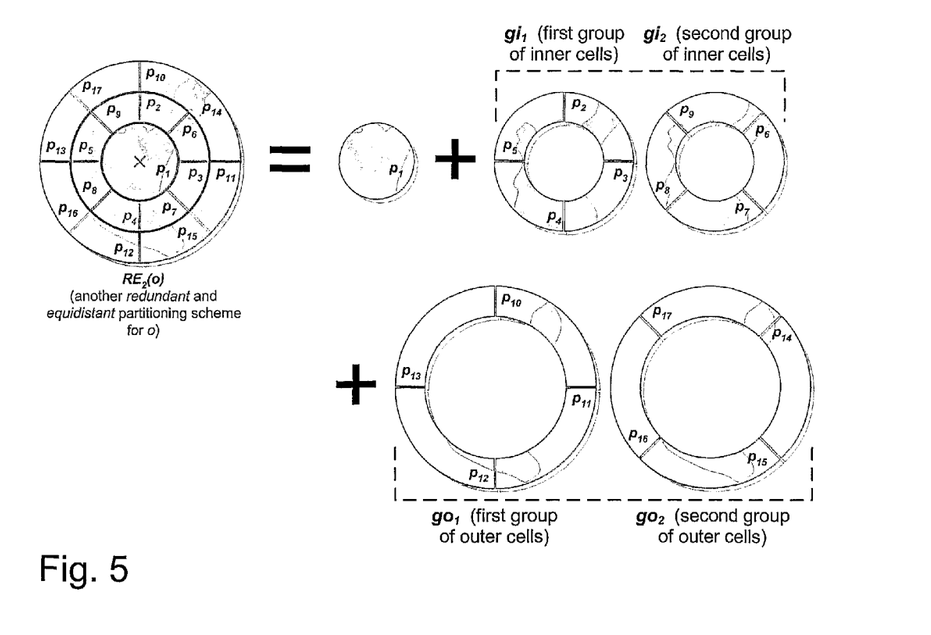
FIG. 5 shows a second example of a redundant and equidistant partitioning scheme according to a third embodiment of the present invention.

FIG. 5 shows a further sample embodiment of a redundant and equidistant partitioning scheme with seventeen cells (d=17). This scheme is derived from the prior art partitioning scheme of FIG. 2 by subdividing the cells $p_2$ and $p_3$ of FIG. 2. More specifically, the second cell $p_2$ of FIG. 2 has been subdivided into a first group $gi_1$ of inner cells $p_2$ to $p_5$ and a second group $gi_2$ of inner cells $p_6$ to $p_9$. The cells contained in each of these groups $gi_1$, $gi_2$ are disjoint within the respective group $gi_1$, $gi_2$. However, the groups $gi_1$, $gi_2$ are shifted with respect to each other such that each cell in one of the groups $gi_1$, $gi_2$ overlaps with two cells of the other group $gi_1$, $gi_2$. Likewise, the third cell $p_3$ of FIG. 2 has been subdivided into a first group $go_1$ of outer cells $p_{10}$ to $p_{13}$ and a second group $go_2$ of outer cells $p_{14}$ to $p_{17}$. Each of the cells $p_2$ to $p_{17}$ has the shape of a sector of a k-dimensional shell in the minimum bounding sphere bs(o).

The examples of redundant and equidistant partitioning schemes of FIG. 4 and FIG. 5 are called $RE_1(o)$ and $RE_2(o)$, respectively.

Figure 6:
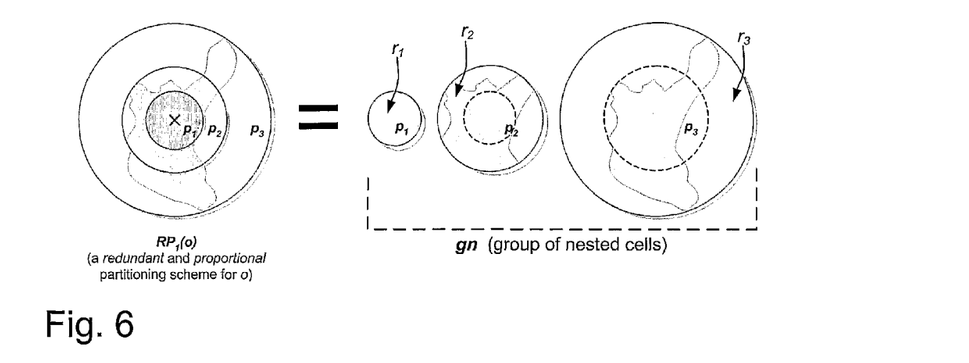
FIG. 6 shows a first example of a redundant and proportional partitioning scheme according to a fourth embodiment of the present invention.
Figure 7:
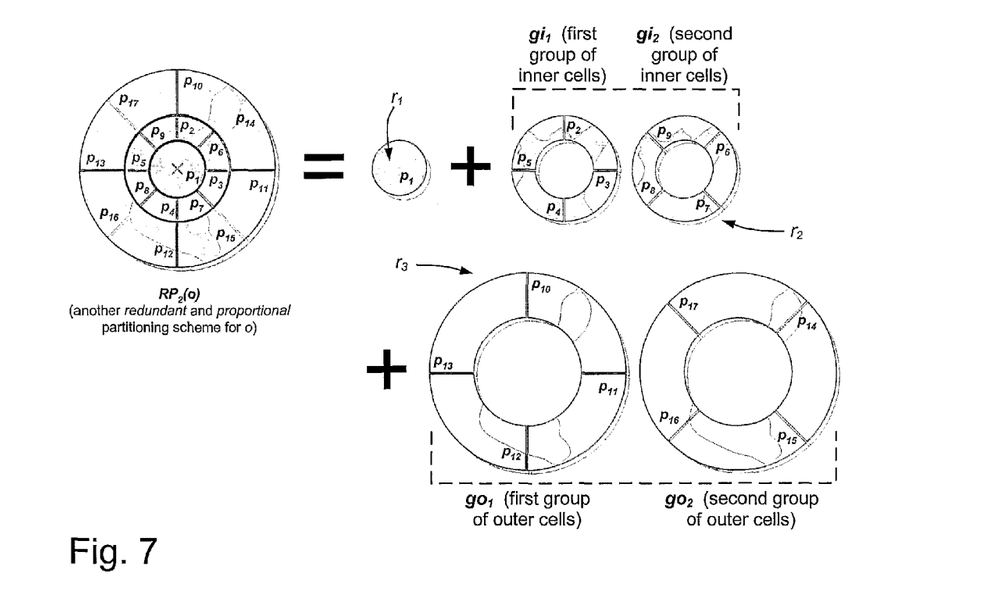
FIG. 7 shows a second example of a redundant and proportional partitioning scheme according to a fifth embodiment of the present invention.

Experiments have shown that the benefits are especially large if proportional and redundant partitioning is combined. A combined redundant and proportional partitioning scheme is called RP. FIG. 6 and FIG. 7 show two sample embodiments of RP-partitioning.

The scheme $RP_1(o)$ of FIG. 6 defines three cells (d=3). This scheme is similar to the scheme $RE_1(o)$ of FIG. 4 in that it defines a group gn of three nested cells $p_1$, $p_2$, $p_3$. However, in contrast to the scheme $RE_1(o)$ of FIG. 4, the boundaries of the cells $p_1$, $p_2$, $p_3$ further define three proportional regions $r_1$, $r_2$, $r_3$ such that $$|o \cap r_i| = \frac{|o|}{d'}$$

for d'=3 holds. The first region $r_1$ is identical to the first cell $p_1$. The second region $r_2$ is delimited by the boundaries of the first and second cells $p_1$ and $p_2$. The third region $r_3$ is delimited by the boundaries of the second and third cells $p_2$ and $p_3$. In other words, the second region $r_2$ is the difference of $p_2$ minus $p_1$, and the third region $r_3$ is the difference of $p_3$ minus $p_2$.

It should further be noted that, in the example of FIG. 6, the volume of the respective portions of the object o in the cells $p_1$ to $p_3$ increases in a regular way, i.e., by 1/d of the total volume of the object o for each cell. In the present example with three cells, the first cell $p_1$ thus contains about ⅓ of the total volume of the object o, the second cell $p_2$ about ⅔, and the third cell $p_3$ the full volume.

The scheme $RP_2(o)$ of FIG. 7 defines seventeen cells (d=17). This scheme is similar to the scheme $RE_2(o)$ of FIG. 5 in that it defines two redundant groups $gi_1$ and $gi_2$ of inner cells and two redundant groups $go_1$ and $go_2$ of outer cells. However, in contrast to the scheme $RE_2(o)$ of FIG. 5, the boundaries of the cells of $RP_2(o)$ further define three proportional regions $r_1$, $r_2$, $r_3$ such that $$|o \cap r_i| = \frac{|o|}{d'}$$

for d'=3 holds; d' is the number of regions. The first region $r_1$ is identical to the first cell $p_1$. The second region $r_2$ is delimited by the curved boundaries of the cells $p_2$ to $p_9$. The third region $r_3$ is delimited by the curved boundaries of the cells $p_{10}$ to $p_{17}$. In other words, the second region $r_2$ is the union of $p_2$ to $p_9$, and the third region $r_3$ is the union of $p_{10}$ to $p_{17}$.

As mentioned above, the methods of the present sample embodiments use a partitioning scheme as shown in one of FIG. 3 to FIG. 7 in order to determine a feature vector for the object o on the basis of an aggregation $\alpha: O \times P \to \mathbb{R}_a$. Suitable aggregation functions are known as such. For example, an aggregation $\alpha_1: O \times P \to \mathbb{R}_1$ may be used that calculates the normalized volume of the portion of the object o that is contained within the respective cell p. Alternatively, an aggregation $\alpha_2: O \times P \to \mathbb{R}_k$ may be used that defines the variance along the k principal axes of the portion of the object o that is contained within the respective cell p. The calculation of aggregation $\alpha_2$ for an object o and a cell p may comprise determining k eigen values that correspond to k eigen vectors spanning the minimum ellipsoid that bounds the portion of the object o contained within the cell p, then sorting the k eigen values, and finally outputting the sorted k eigen values as the result $\alpha_2(o,p)$. The calculations necessary to implement aggregations $\alpha_1$ and $\alpha_2$ are described in more detail in sections 3.4.1 and 3.4.3 of the research paper "Effective Similarity Search on Voxelized CAD Objects", which has been cited above. These sections are incorporated herewith into the present document by reference.

In the above sample embodiments, the feature vector $\phi(o)$ for a given object o is simply the concatenation of all results obtained by applying the aggregation $\alpha$ to all cells p defined by the corresponding partitioning scheme. In other embodiments, further normalization or other additional processing steps may be performed.

All in all, the resulting similarity measure can be used for classifying large collections of objects according to their geometrical features, or for performing database searches for similar objects, or for other tasks in which the geometric similarity of objects must be evaluated.

Figure 8:
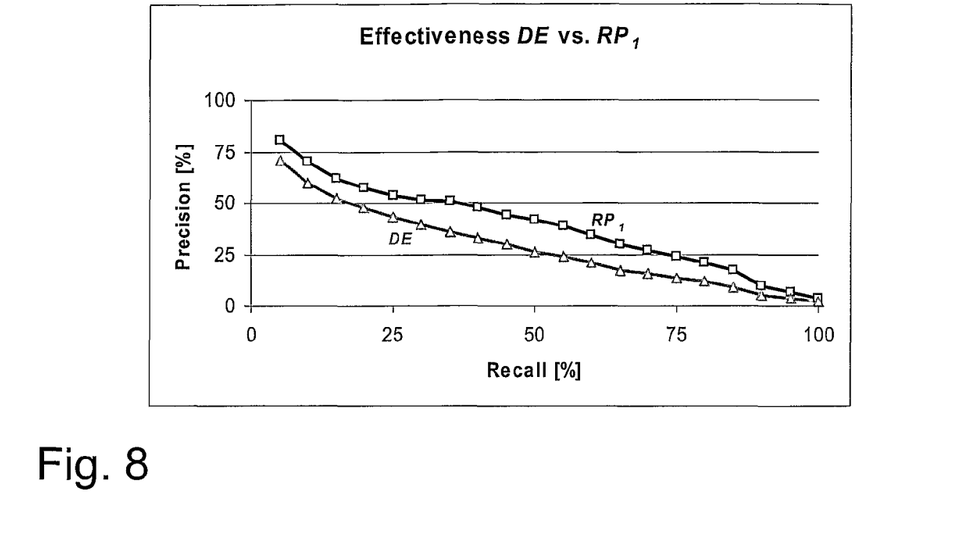
FIG. 8 shows a precision-recall plot comparing the prior art partitioning scheme of FIG. 2 and the partitioning scheme of FIG. 6.

In order to assess the merits of the present invention, the effectiveness of the presently proposed partitioning approaches have been compared with one of the best prior art techniques, which is based on a DE partitioning with a spherical harmonic value aggregation function, as proposed in the research paper "Rotation Invariant Spherical Harmonic Representation of 3D Shape Descriptors", which has been cited above. Very encouraging results have been obtained. For example, FIG. 8 shows the results for the prior art DE partitioning and the present $RP_1$ partitioning on a protein database. At a recall of 50%, the $RP_1$-based method shows a precision of 42%, as opposed to a precision of 26% for the DE-based method. At a recall of 80%, $RP_1$ delivers nearly twice the precision than DE. Similar results have been obtained on CAD and on web data.

Figure 9:
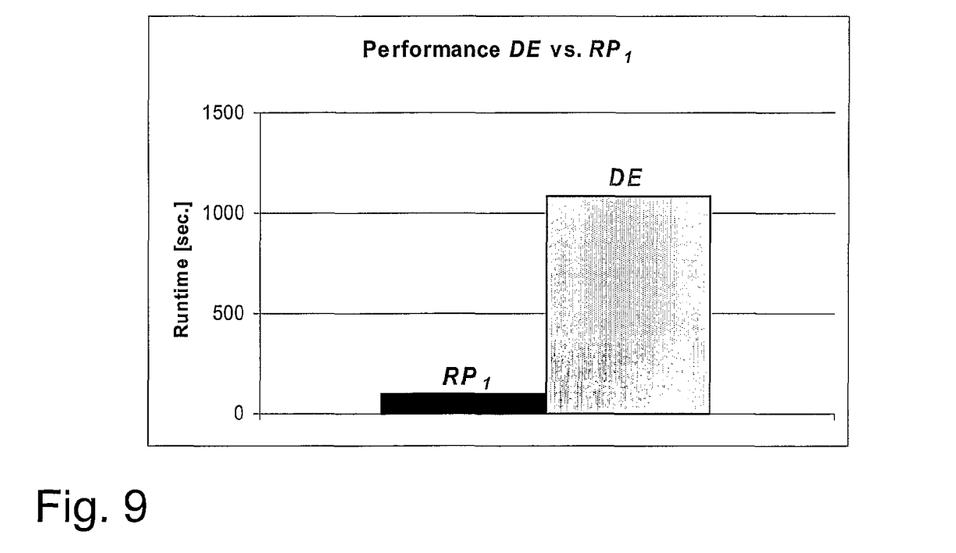
FIG. 9 shows a diagram comparing the total runtime for a classification using the prior art partitioning scheme of FIG. 2 and the partitioning scheme of FIG. 6 on protein data.

FIG. 9 shows performance results that have been obtained in the same configuration as above. It is apparent that $RP_1$ runs about 10 times faster than DE. Thus, $RP_1$ does not only yield a much higher effectiveness than DE, but also has a dramatically lower runtime cost. The slower performance of DE is due to the fact that it requires a much more fine-grained partitioning scheme in order to deliver good results. Thus, the generated feature vectors for DE are much longer and more expensive to be evaluated by the distance function.

It is apparent that the present invention can be used for improving the accuracy and effectiveness of similarity based search and/or classification methods. The particulars contained in the above description of sample embodiments should not be construed as limitations of the scope of the invention, but rather as exemplifications of preferred embodiments thereof. Many other variations are possible and will be readily apparent to persons skilled in the art. Accordingly, the scope of the invention should be determined not by the embodiments illustrated, but by the appended claims and their legal equivalents.

The invention claimed is:

1. A method for determining feature data that represents information about the shape of an object, the object being located in a k-dimensional space, the method comprising the steps of:
   determining, by a computer, a partitioning scheme that defines a plurality of cells in the space in which the object is located such that at least some of the cells each contain a respective portion of the object, wherein at least some of the cells defined by the partitioning scheme represent k-dimensional spheres, k-dimensional shells, sectors of k-dimensional spheres, or sectors of k-dimensional shells in the space in which the object is located; and
   determining, by the computer, the feature data for the object on the basis of at least one property of the respective portions of the object that are contained in the plurality of cells, wherein at least two of the plurality of cells overlap each other at least in part.

2. The method of claim 1, wherein the plurality of cells comprises at least a first and a second group of cells such that the union of the cells in the first group of cells coincides with the union of the cells in the second group of cells, wherein each cell of the first group of cells overlaps at least in part with at least one respective cell of the second group of cells.

3. The method of claim 1 or claim 2, wherein the plurality of cells comprises at least a group of nested cells, wherein all cells of the group of nested cells are nested within each other.

4. The method of claim 3, wherein the cells of the group of nested cells form a sequence in which the k-dimensional volume of the respective portions of the object that are contained in the cells of the group of nested cells increases in a substantially regular manner.

5. The method of claim 1, wherein the feature data for the object is determined on the basis of the k-dimensional volume of each respective portion of the object contained in each cell of the plurality of cells and/or on the basis of data defining the k principal axes of each respective portion of the object contained in each cell of the plurality of cells.

6. The method of claim 1, wherein the determining steps are performed first for a first object and then also performed for a set of second objects to determine feature data for the first object and for each of the set of second objects, and further comprising performing a similarity search between the first object and the set of second objects based on a comparison of the determined feature data.

7. The method of claim 1, wherein the determining steps are performed to determine feature data for each object of a set of objects, and wherein the objects of the set of objects are grouped according to their respective similarities on the basis of a classification of the determined feature data.

8. A method for determining feature data that represents information about the shape of an object, the object being located in a k-dimensional space, the method comprising the steps of:
determining, by a computer, a partitioning scheme that defines a plurality of cells in the space in which the object is located such that at least some of the cells each contain a respective portion of the object, and
determining, by the computer, the feature data for the object on the basis of at least one property of the respective portions of the object that are contained in the plurality of cells, wherein the partitioning scheme is determined such that at least some of the boundaries of the cells defined by the partitioning scheme are adapted to the individual shape of the object to delimit a plurality of regions in the space in which the object is located such that the respective portions of the object that are contained in the plurality of regions are approximately equal to each other with respect to a predetermined measurement metric.

9. The method of claim 8, wherein the plurality of cells comprises at least a first and a second group of cells such that the union of the cells in the first group of cells coincides with the union of the cells in the second group of cells, wherein each cell of the first group of cells overlaps at least in part with at least one respective cell of the second group of cells.

10. The method of claim 8 wherein at least one region of the plurality of regions contains at least two cells of the plurality of cells that overlap each other at least in part.

11. The method of claim 8, wherein all regions of the plurality of regions are disjoint with respect to each other.

12. The method of claim 8, wherein the measurement metric, for each region of the plurality of regions, is the k-dimensional volume of the respective portion of the object contained in this region.

13. The method of claim 8, wherein each region of the plurality of regions corresponds to the union and/or difference and/or intersection of at least two cells of the plurality of cells or to exactly one cell of the plurality of cells.

14. The method of claim 8, wherein at least some of the regions of the plurality of regions represent k-dimensional spheres and/or k-dimensional shells and/or sectors of k-dimensional spheres and/or sectors of k-dimensional shells in the space in which the object is located.

15. A non-transitory computer-readable medium encoded with executable program instructions for execution by at least one processor, wherein the program instructions cause the at least one processor to perform a method according to claim 1 or claim 8.

16. An apparatus, comprising: at least one processor, wherein the apparatus is configured to perform a method according to claim 1 or claim 8.

* * * * *